April 11, 1939.  E. J. POITRAS ET AL  2,153,774

FLUID SEAL

Filed July 15, 1936

INVENTORS
Edward J. Poitras
James D. Tear
BY
THEIR ATTORNEY

Patented Apr. 11, 1939

2,153,774

UNITED STATES PATENT OFFICE 2,153,774

FLUID SEAL

Edward J. Poitras, Jackson Heights, and James D. Tear, Great Neck, N. Y., assignors to Ford Instrument Company, Inc., Long Island City, N. Y., a corporation of New York Application July 15, 1936, Serial No. 90,664

3 Claims. (Cl. 286—27)

The invention herein disclosed relates to providing an effective fluid seal between two contiguous surfaces.

In hydraulically operated apparatus in which it is important to prevent leakage from ports and passages, for example, it is difficult to fit two surfaces together, and particularly if the surfaces are relatively movable, without having leakage of the hydraulic medium when the two surfaces form parts of a chamber, port or passage carrying the hydraulic medium under pressure; and it is an object of this invention to obtain a perfect seal between two such contiguous surfaces with ordinary commercial fits, that is, between surfaces that are not machined with greater care than that care normally used in commercial apparatus.

In accordance with the invention there is provided a sealing groove in one of two such contiguous surfaces. The sealing groove is made intermediate the chamber for the hydraulic medium and the outer edges of the surfaces and it is maintained full of a hydraulic medium under substantially the same pressure as the hydraulic medium in the chamber by a pressure regulator. The pressure regulator constitutes in effect a hydraulic potentiometer in that it supplies liquid at any required pressure between the supply pressure and exhaust. Specifically, the pressure regulator may take the form of a hydraulically actuated piston valve that is interconnected to control the pressure of the oil in the sealing groove between the limits of the supply pressure and the exhaust. The valve is actuated in some installations in accordance with the difference in pressure between the pressure of the liquid in the sealing groove and a substantially constant pressure, and in other installations, particularly those in which the fluid in the chamber is under a variable pressure, in accordance with the difference between the pressures of the liquid in the chamber and the sealing groove.

Figure 1:
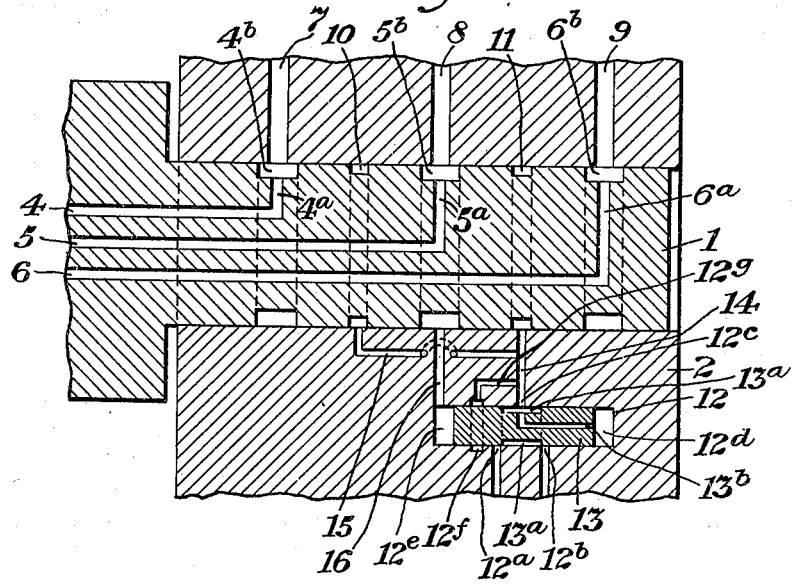
Figure 2:
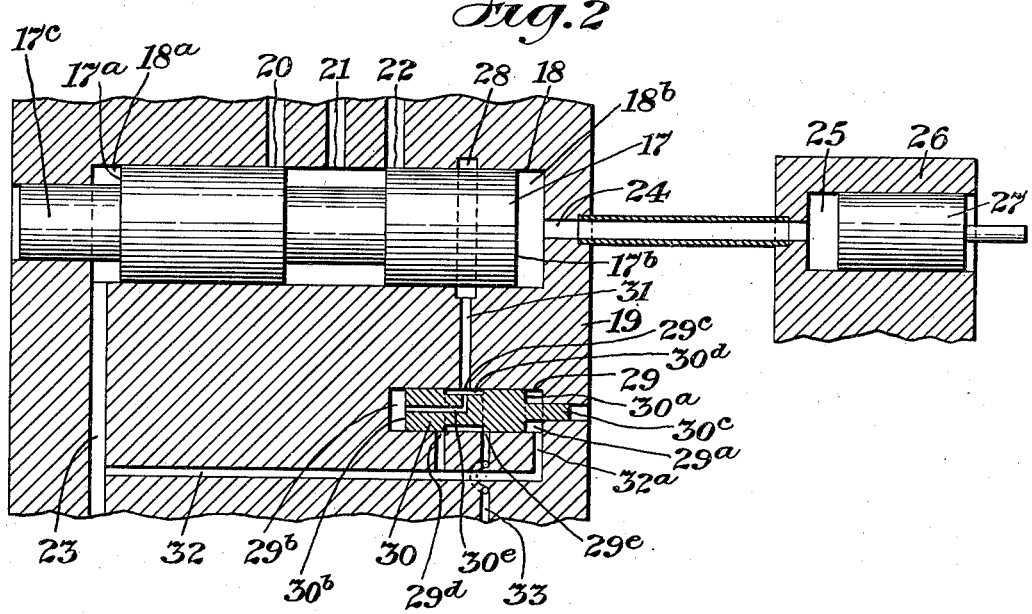

Two such seals are illustrated in the accompanying drawing in which:

Fig. 1 is a diagrammatic representation of a seal for a passage extending through a trunnion and its bearing in which the protected volume is at variable pressure; and Fig. 2 is a diagrammatic representation of a seal for a hydraulically operated piston valve in which the protected volume is at substantially constant pressure.

In Fig. 1 there is illustrated a trunnion 1 journaled in a bearing bracket 2. The trunnion has three passages 4, 5, and 6 for carrying a hydraulic medium such as oil under pressure. These passages extend longitudinally of the trunnion and have branch passages 4a, 5a and 6a extending radially of the trunnion and communicating with circumferential grooves 4b, 5b, and 6b in the trunnion which communicate with passages 7, 8, and 9 in the bearing bracket 2. The circumferential grooves in the trunnion maintain communication between the passages 4, 5, and 6 and the passages 7, 8, and 9 respectively, irrespective of the rotational movement of the trunnion relative to the bearing bracket 2. The passages 5 and 8 form a part of a system of ports and passages in which it is desired to maintain the volume of liquid constant and, therefore, it is desired to prevent the passage of liquid between the contiguous surfaces of the trunnion and the bearing either into or out of the chamber or groove 5b. To this end, seals are provided on each side of the groove 5b to prevent the passage of liquid between the groove 5b and either of the grooves 4b or 6b.

The seals consist of a circumferential groove 10 in the trunnion 1 between the grooves 4b and 5b and a similar circumferential groove 11 cut in the trunnion between the groove 5b and the groove 6b. The grooves 10 and 11 are supplied with oil maintained at a pressure equal to that of the liquid in the groove 5b by the pressure regulator.

The pressure regulator consists of a valve chamber 12 in which a piston valve 13 is slidably mounted. The piston valve 13 has a reduced central portion 13a and the valve chamber has an exhaust port 12a, a pressure port 12b which is connected to a source of oil under pressure somewhat greater than the maximum pressure of the oil in the passages 5 and 8, and a sealing groove port 12c which is connected by a passage 14 to the sealing groove 11 and by a branch passage 15 to the sealing groove 10. The ports 12a, 12b, and 12c are arranged so that the reduced portion 13a of the valve controls communication between the port 12c and the ports 12a and 12b. The valve 13 is shown in Fig. 1 in the neutral position. In this position the exhaust and pressure ports are slightly open, that is, the valve has a slight negative lap so that it acts similar to a potentiometer.

The valve chamber 12 is somewhat longer than the piston valve 13 and there is formed at each end of the valve chamber a pressure chamber 12d and 12e, the ends of the valve forming the end walls of these chambers. The chamber 12d is connected to the port 12c, and consequently to the sealing grooves, by a right-angular passage 13b which extends longitudinally through the valve from the end thereof forming an end wall of the chamber 12d and radially of the valve at the reduced portion 13a of the valve. The oil in the sealing grooves, therefore, is admitted to the chamber 12d and acts upon the piston valve to move the valve to the left from the position shown in Fig. 1, and thus cut off the pressure port and place the exhaust port 12a into communication with the sealing groove port 12c. The action of the oil in the chamber 12d is opposed by the pressure of the oil in the chamber 12e. This latter chamber is connected by a passage 16 to the groove or chamber 5b.

The pressure regulator is thus actuated in accordance with differences in pressure between the pressure of the liquid in the sealing grooves 10 and 11 and the pressure of the liquid in the groove 5b and regulates the pressure of the liquid in the sealing grooves to maintain it equal to the pressure of the liquid in the groove 5b irrespective of variations in the pressure of the liquid in the groove 5b. This is accomplished by the valve 13 moving from its neutral position in the direction to close the exhaust port 12a and open the port 12b, when the pressure in the groove 5b exceeds, even slightly, the pressure in the sealing grooves. The pressure in the sealing grooves is thus increased to correspond with the pressure in the groove 5b, due to the piston 13 being slightly off the neutral position. Similarly, a decrease in the pressure in the groove 5b causes the valve to move in the direction to close the pressure port 12b and thus effect a lowering of the pressure in the sealing grooves to correspond with the reduced pressure in the groove 5b.

Since the pressure of the liquid in the sealing grooves is thus maintained equal to the pressure of the liquid in the groove 5b there cannot be any flow of oil between the contiguous surfaces of the trunnion and bearing either into or out of the groove 5b. This is true irrespective of leakage between the groove 4b and the sealing groove 10 and between the groove 6b and the sealing groove 11 for the balance of pressure between the groove 5b and the sealing grooves is maintained irrespective of the flow of oil into or out of the sealing grooves. If, for example, the pressure in the groove 6b exceeds the pressure in the groove 5b and there is a flow of liquid to the groove 11, the valve 13 will be regulated to take care of this flow of liquid. The same is true, as will be obvious, if there is a flow of liquid from either of the grooves 10 or 11 to the grooves 4b or 6b respectively for, as heretofore explained, the valve 13 is actuated in accordance with the pressures of the liquids in the sealing grooves and the groove 5b. The groove 5b is thus effectively sealed even though the parts are not machined more accurately than surfaces which are ordinarily used for commercial purposes.

As a precautionary measure, there is provided a similar oil seal about the valve 13. This oil seal includes an oil groove 12f cut in the surface of the valve chamber between the chamber 12e and the exhaust port 12a. This sealing groove is connected by a passage 12g to the passage 14 so that there will be no flow of oil between the chamber 12e and the chamber formed by the reduced portion of the valve.

In Fig. 2, the seal is shown as applied to a piston valve 17 that is mounted in a valve chamber 18 of a valve block 19. The piston valve 17 is a hydraulically operated piston valve and controls communication between ports 20, 21, and 22, that is, the valve controls communication between the port 21 and the ports 20 and 22. One end surface 17a of the valve has a surface area of aproximately one-half of the other end surface 17b. The effective area of the surface 17a is reduced by virtue of a reduced extension 17c which extends from this end of the piston valve and into an opening in the end wall of the valve chamber. The end surface 17a of the piston valve forms one end of a pressure chamber 18a and the end surface 17b of the piston valve forms an end wall of a pressure chamber 18b. The chamber 18a is connected to a source of fluid under a substantially constant pressure by a passage 23 and the chamber 18b is connected by a passage 24 to a variable volume chamber 25 formed in a plunger block 26. The volume of the chamber 25 may be varied by a manually operable plunger 27 mounted in the valve block and forming one end wall of the chamber 25. In the elements of the system as shown in the drawings, the pressure of the oil in the chamber 18b is one-half of the pressure of the oil in the chamber 18a. If, therefore, the piston 27 is moved to the right from the position shown in Fig. 2 the pressure in the chamber 18b will be slightly reduced and the force acting upon the piston surface 17a will be greater than that acting upon the piston surface 17b and the piston 17 will move to the right and open communication between the ports 21 and 22. Similarly, if the plunger 27 is moved to the left from the position shown in Fig. 2 the pressure in the chamber 18b will be increased slightly and force the piston 17 to the left, opening communication between the ports 20 and 21. The chambers 18b, 25 and passage 24 thus comprise between pistons 17 and 27 a coupling that is free from lost motion and friction.

From this explanation of the hydraulic system shown in Fig. 2 it will be apparent that the volume of oil in the system of which the chamber 18b, the passage 24 and the chamber 25 form a part, must be maintained constant when the system is used in certain control systems.

For the purpose of maintaining constant the volume of oil in the portion of the system of which the chamber 18b forms a part, there is provided a seal between the chamber 18b and the port 22. This seal includes a circumferential groove 28 cut into the wall of the valve chamber and positioned between the chamber 18b and the port 22. Oil under pressure is supplied to this groove 28 by a pressure regulator. The pressure regulator consists of a cylindrical valve chamber 29 in which there is slidably mounted a piston valve 30. One end surface 30a of the valve 30 has an effective area of one-half of the other end surface 30b. The effective area of the end surface 30a is reduced by an extension 30c which extends from the surface 30a and into an opening in the end wall of the valve chamber. The surfaces 30a and 30b are respectively proportional to the surfaces 17a and 17b of the piston valve 17.

The valve chamber 29 is somewhat longer than the valve 30 and there is formed at each end of the valve 30 a pressure chamber, 29a and 29b. The end surface 30a of the piston forms an end wall of the pressure chamber 29a and the end surface 30b of the valve 30 forms an end wall of the pressure chamber 29b. The valve has a central reduced portion 30d by means of which communication between a port 29c and ports 29d and 29e is controlled. This valve also has a slight negative lap. The port 29c is connected by a passage 31 to the sealing groove 28; the port 29d is connected by a passage 32 to the passage 23; and the port 29e is connected to an exhaust passage 33. A right-angled passage 30e formed in the valve and including a longitudinal section communicating with the pressure chamber 29b and a radial section communicating with the port 29c places the pressure chamber 29b into communication with the sealing groove 28. A passage 32a connects the pressure chamber 29a to the passage 32 and thus to the passage 23 carrying oil under substantially constant pressure.

Oil under pressure in the passage 32 acts upon the surface 30a of the piston valve 30 to move the piston valve in a direction to cut off the exhaust port 29e and open the port 29d to the port 29c. Thus oil is delivered to the oil groove 28. Oil in the groove 28 is maintained at one-half the pressure of the oil in the passage 23 since the area of the surface 30b is twice the area of the surface 30a. If the oil in the groove 28 exceeds a pressure equal to one-half the pressure of the oil in the passage 23, the valve 30 will be moved to cut off the pressure port 29d and to effectively place the port 29c into communication with the exhaust port 29e until the pressure in the sealing groove 28 is equal to one-half the pressure of the oil in the passage 23, that is, equal to the pressure of the oil in the chamber 18b. There is thus maintained in the sealing groove oil under a pressure substantially equal to the pressure in the chamber 18b, and, consequently, there will be no flow of oil from the chamber 18b between the contiguous surfaces of the valve chamber and the valve to the ports 22, 21 and 20.

The system described in Fig. 2 is suitable for a condition such as that illustrated in Fig. 2 wherein the pressure in the chamber 18 which is being guarded does not vary materially.

From the above description of the seal provided between two contiguous surfaces, it will be seen that the seal is effective to prevent leakage of oil between two contiguous surfaces even though those surfaces are not machined with greater accuracy than is normally used for commercial production; and that the means for producing this seal is both inexpensive and self-operative.

It will be obvious that various changes may be made by those skilled in the art in the details of the embodiments of the invention illustrated in the drawing and described in detail above within the principle and scope of the invention as expressed in the appended claims.

We claim:

1. In a device having a chamber for a hydraulic medium under pressure and having two contiguous surfaces between which the hydraulic medium may pass, means for effecting a seal to prevent the passage of the hydraulic medium between the contiguous surfaces comprising a sealing groove in one of the contiguous surfaces, and a pressure regulator for maintaining liquid in the sealing groove under pressure including a cylindrical valve chamber having an inlet and exhaust port and a port communicating with the sealing groove, a hydraulically actuated piston valve within the valve chamber for controlling communication between the sealing groove port and the inlet and exhaust ports, the valve being actuated in accordance with opposing pressures, one of which being the pressure of the liquid in the sealing groove.

2. In a device having a chamber for a hydraulic medium under pressure and having two contiguous surfaces between which the hydraulic medium may pass, means for effecting a seal to prevent the passage of the hydraulic medium between the contiguous surfaces comprising a sealing groove in one of the contiguous surfaces, and a pressure regulator for maintaining liquid in the sealing groove under pressure including a cylindrical valve chamber communicating at one end with a source of fluid under a pressure variable in accordance with the pressure in the chamber and at the other end with the sealing groove and having an inlet and exhaust port and a port communicating with the sealing groove, and a piston valve within the valve chamber for controlling communication between the sealing groove port and the inlet and exhaust ports.

3. In a device having a chamber for a hydraulic medium under pressure and having two contiguous surfaces between which the hydraulic medium may pass, means for effecting a seal to prevent the passage of the hydraulic medium between the contiguous surfaces comprising a sealing groove in one of the contiguous surfaces, and a pressure regulator for maintaining liquid in the sealing groove under pressure including a cylindrical valve chamber communicating at one end with the chamber and at the other end with the sealing groove and having an inlet and exhaust port and a port communicating with the sealing groove, and a piston valve within the valve chamber operative in accordance with the difference in pressure between the hydraulic medium in the chamber and the sealing groove for controlling communication between the sealing groove port and the inlet and exhaust port.

EDWARD J. POITRAS.
JAMES D. TEAR.